United States Patent [19]

Kopernik et al.

[11] 3,898,513

[45] Aug. 5, 1975

[54] AUTOMOTIVE VEHICLE ELECTRICAL LOAD SUPERVISORY SYSTEM

[75] Inventors: Viktor Köpernik, Ettlingen; Helmut Steinmann, Baden-Baden, both of Germany

[73] Assignee: Robert Bosch G.m.b.H., Stuttgart, Germany

[22] Filed: July 11, 1973

[21] Appl. No.: 378,188

[30] Foreign Application Priority Data

July 20, 1972 Germany ........................... 2235642

[52] U.S. Cl. ......................... 315/129; 324/34 MC, 307/174 TC; 340/251; 179/18 FT

[51] Int. Cl.² ........................................... H01J 1/60

[58] Field of Search ......... 315/129, 77; 324/34 MC; 307/174 TC; 340/251, 253 B; 179/18 FT, 18 FG

[56] References Cited

UNITED STATES PATENTS

| | | | |
|---|---|---|---|
| 3,013,257 | 12/1961 | Ippolito | 315/129 X |
| 3,254,157 | 5/1966 | Guercio et al. | 179/18 FF |
| 3,293,489 | 12/1966 | Marshall | 315/129 X |
| 3,524,933 | 8/1970 | Risky | 179/18 FG |
| 3,614,730 | 10/1971 | Bozolah | 315/129 X |
| 3,624,630 | 11/1971 | Schroeder | 340/251 X |
| 3,714,556 | 1/1973 | Risky | 324/34 R |
| 3,735,378 | 5/1973 | McNamee | 315/129 X |

*Primary Examiner*—Nathan Kaufman
*Attorney, Agent, or Firm*—Flynn & Frishauf

[57] ABSTRACT

To monitor current flowing through various load lines, typically to the supply lines for the lighting system of the vehicle (headlights, brake lights, position lights) each line has a ferrite core with approximately rectangular hysteresis characteristic threaded thereon, through which additionally a test signal wire and a read signal wire are threaded. The test signal wire is connected to an ac source, the read signal wire to an indicator lamp through an amplifier so that, when current flows through the supply line, the core will saturate and no ac will be transferred from the test signal wire to the read signal wire; upon interruption of current flow, for example due to burnout of a lamp, current will flow through the test indicator, typically a lamp, which will light indicating malfunction.

9 Claims, 10 Drawing Figures

PATENTED AUG 5 1975 3,898,513

SHEET 1

AUTOMOTIVE VEHICLE ELECTRICAL LOAD SUPERVISORY SYSTEM

The present invention relates to a monitoring system to provide an indication of the operability of electrical loads in vehicles, typically automotive vehicles, by supervising the current flow to each one of the loads, for example the respective lights and lamps of the vehicle.

It is important for operating safety of a vehicle that various loads are monitored with respect to their operation, and most importantly, that the vehicle operator be provided with an indication that the lights on the vehicle are operating properly. The indication should be available on the dashboard of the vehicle, that is, the dashboard should contain all the supervisory and indicating devices, which indicate to the operator the condition of the various components and elements in the vehicle. Systems or components to be supervised are, for example, the pressure switches of the brake system, headlights and position lights of the vehicle or the like. It is desirable, for example, to provide an indication that the brake lights operate properly, that is, that none of the brake lights are burned out.

It has been proposed to check the operation of the lighting system of vehicles by utilizing so called light pipes, which have one end exposed in the vicinity of the light source, and another end in the dashboard of the vehicle. The light guides or light pipes then provide an indication of the operability of the illumination system. Such devices are very expensive, difficult to install in vehicles, and do not provide an inverted indication, that is, they supervise proper operation but do not give a warning indication when a lamp fails to operate. Thus, the driver has to be alert to proper operation of all elements, rather than being warned of improper operation of one of them.

It is an object of the present invention to provide a supervisory system for electrical loads, and more particularly for the various lights in vehicles, typically automotive vehicles, which is inexpensive, reliable, and provides an inverted output, that is, a positive indication of malfunction, and which is suitable for subsequent installation in motor vehicles, as well as for installation as original equipment.

SUBJECT MATTER OF THE PRESENT INVENTION

Briefly, the electrical conductor to the respective loads to be monitored, at least one of the headlight wires, are threaded through a ferrite core with essentially rectangular hysteresis characteristic. Each one of the ferrite cores additionally has a signal wire and a reading wire carried therethrough, the signal wire being connected to a source of alternating current and the reading wire being connected to an indicating system which, preferably, includes an alarm lamp which can be mounted on the dashboard.

The invention will be described by way of example with reference to the accompanying drawings, wherein.

Figure 1:
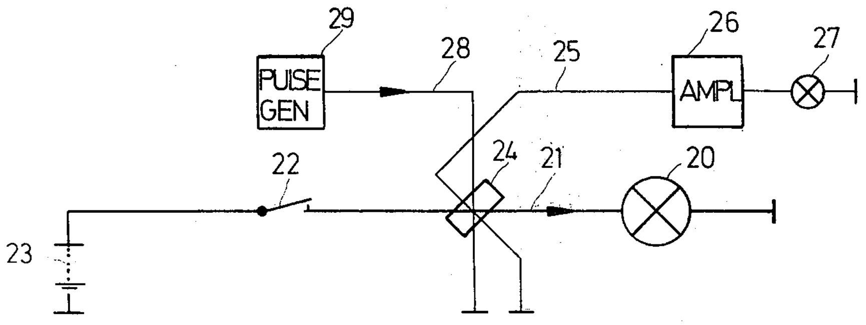
FIG. 1 is a highly schematic simplified diagram of a monitoring system for an automotive vehicle in accordance with the present invention.
Figure 2:
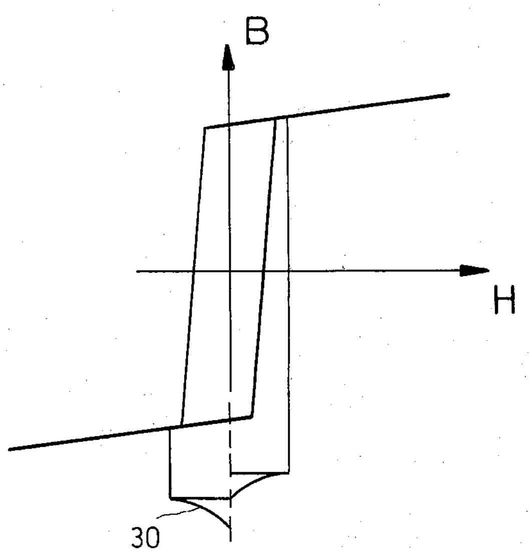
FIG. 2 is a graph illustrating the operation of the apparatus of FIG. 1.
Figure 3:
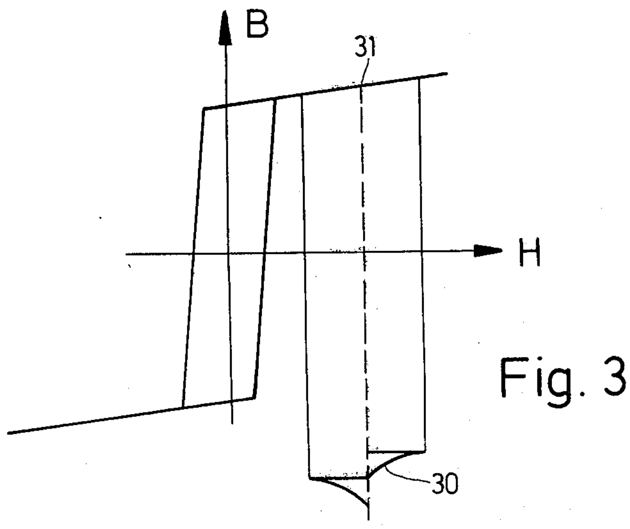
FIG. 3 is a further graph to illustrate the operation of the apparatus of FIG. 1.

The system of FIG. 1 illustrates the simplest form of the apparatus of the present invention, that is, to monitor a single load 20, for example one headlight of the vehicle, or the main headlight connection. Lamp 20 is connected by a supply conductor 21 over a switch 22 with the power source, which is the usual power supply of an automotive vehicle including a battery 23. The electrical line 21 to the lamp 20 is carried through a ferrite core 24 which has an essentially rectangular hysteresis characteristic, as seen in FIGS. 2 and 3. Ferrite core 24 further has a read wire 25 threaded therethrough which is connected over an amplifier 26 with a monitor or indicator lamp 27. Ferrite core 24 further has a signal or test wire 28 carried therethrough which is connected to a source of alternating current, for example to an oscillator formed as an astable multivibrator, that is, as a pulse generator 29. Other types of signal sources may be used, for example which deliver a sinusoidal voltage.

Operation, with reference to FIGS. 2 and 3: FIG. 2 illustrates magnetic induction B with respect to field strength H. Ferrite core 24, as seen in the Figures, has an approximately rectangular hysteresis loop. If lamp 20 is not illuminated, and pulses in the form of pulses 30 are applied by pulse generator 25 to the ferrite core, then the ferrite core will go through its entire hysteresis loop, operating like a transformer, so that in the read wire 25 a signal will be obtained which is similar to the signal illustrated by the input signal 30. Amplifier 26, therefore, will have a signal applied thereto when lamp 20 does not operate which, when amplified, causes lamp 27 to light. This is the indication to the operator of the vehicle that lamp 20 does not carry current, for example is burned out.

Under normal operation, electrical line 21 will carry lamp current. This saturates the ferrite core 24 and a working point 31 (FIG. 2) will be established in the ferrite core. When the ferrite core 24 is saturated, signals 30 (FIG. 3) to provide only minor change in the magnetic induction, although the change in magnetic field strength is the same as that when the line 21 is open. The read wire 25, however, will have only a very small voltage induced therein which is below the response level of the amplifier 26 and monitoring lamp 27 will not provide an output indication. Thus, if the lamp 27 is arranged in the form of a warning lamp, it gives an indication when there is malfunction in lamp 20.

Figure 4:
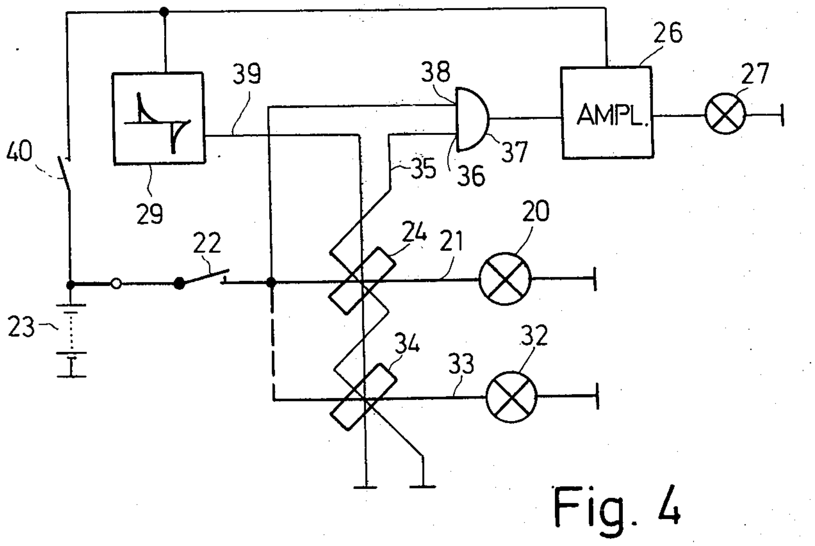
FIG. 4 is a schematic diagram of another embodiment.

The apparatus in accordance with FIG. 1 permits monitoring the operation of incandescent lamps, and any type of electrical load. The light 27 will be illuminated, however, also when the lamp 20 has been disconnected by switch 22, since in the circuit of FIG. 1 indicator 27 will be illuminated at all times when lamp 20 is not energized. It is thus necessary to so lay out the circuit that lamp 20 provides a warning signal only when the lamp should light, but does not. The circuit of FIG. 4 fulfills this function.

Two head lamps 20, 32 are to be monitored. Head lamp 20 is connected over electrical line 21 to its main switch 22. Head lamp 32 is connected over its supply line 33 likewise to the operating switch 22 which, in turn, connects to the main supply. Ferrite core 24 is connected over line 21, and ferrite core 34 is connected over line 33. Both ferrite cores 24, 34 have a common read wire 35 passing therethrough, which is connected to one input 36 of an AND-gate 37. The second input 38 is connected to the common operated switch 22, which is connected to the source of voltage 23. Ferrite cores 24, 34 additionally have the test signal conductor 39 passing therethrough, connected to pulse source 29. The output of the AND-gate is connected to amplifier 26, the output of which is connected to indicator lamp 27.

Operation: Upon closing of the ignition switch 40 of the vehicle, pulse source 29 and amplifier 26 are connected to the battery 23. Pulse source 29 provides pulses over line 39. If the light switch 22 for lamps 20, 32 is open, ferrite cores 24, 34 are not saturated, and act as inductive transformers providing signals corresponding to pulses 30 from source 29 in the read wire 35, applied to the first input 36 of the AND-gate 37. A second input 38 of AND-gate 37 however, is not energized since switch 22 is open. Thus, a control connection to amplifier 26 is inhibited and lamp 27 will not light. Upon closing of switch 22, the second input 38 of AND-gate is energized. If proper lamp current flows, ferrite cores 24, 34 are saturated and there will be no signal to the first input 36 of AND-gate 37 and lamp 27 likewise will remain extinguished. If any one of the lamps 20, 32 burns out, read wire 35 will have a voltage induced therein which will be applied to the first input 36 of the AND-gate 37. Since the switch 22 is then closed, a signal will be available at the second input 38 of the AND-gate 37, and indicator lamp 27 will give a malfunction indication, showing that one of the two lamps 20, 32 are burned out.

The circuit as described can be extended and expanded as desired, that is, any number of lamps can be monitored this way. Each one of the supply lines to the lamps then will have a ferrite core located thereover, through which the signal wire 39 as well as the read wire 35 are threaded.

Figure 5:
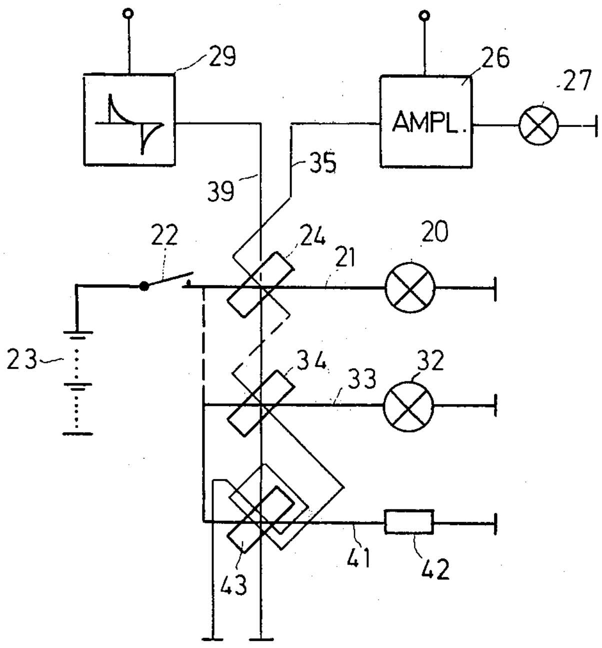
FIG. 5 is a schematic diagram of yet another embodiment.

FIG. 5: Two lamps 20, 32 are being monitored, connected over lines 21, 33 to switch 22, which connects to the source 23 of electrical supply to the vehicle. Ferrite cores 24, 34 are slipped over supply lines 21, 33. Signal wire 39 is connected with pulse source 29, and read wire 35 is connected to amplifier 26, the output of which is connected to signal lamp 27. A compensating line 41, in series with a compensating resistor 42 is additionally connected to switch 22. The signal wire 39 is threaded through core 43 slipped over compensating line 41; the read wire 35 is wound over the compensating core 43. The direction of turns is counter to the direction of the threading of the read wire through cores 24, 34, with respect to current passing in signal line 39, and the number of turns on core 43 corresponds to the number of lamps to be supervised, that is, to the number of the other ferrite cores present in the monitoring system, in the present instance two cores 24, 34, so that core 43 will have two turns of windings therearound.

Operation, FIG. 5: When the switch 22 is open, that is, when lamps 20, 32 are disconnected, pulses from source 29 are transferred over wire 39 to induce in wire 35 a voltage which is the sum of the voltages induced by cores 24, 34. Since the wires are wound counter the direction of the test wire 39, however, in core 43, and the number of turns around core 43 corresponds to the number of cores, a voltage which is equal and opposite to that induced in the cores 24, 34 will be induced in core 43. The voltage applied to amplifier 26, therefore, will be zero, and lamp 27 will not light.

Upon closing of operating switch 22, lamps 20, 32 as well as the compensating resistor 42 are connected to the source of current. No voltage will be induced in the read wire, since all the cores 24, 34, 43 are saturated, and no signal will be transmitted to the input of amplifier 26, and lamp 27 will remain extinguished. If one of the lamps 20 or 32 should burn out, then the respective core 24, or 34 will have a voltage induced which implies an input voltage to amplifier 26.

The number of lamps to be supervised can be increased if the number of turns of ferrite core 43 are increased corresponding to the number of cores. The voltage applied to pulse source 29 and to amplifier 26 is preferably applied as soon as the ignition switch is closed (see FIG. 4). The system of FIG. 5 will be self-indicating, that is, if malfunction should arise in line 41 (for example burnout of resistor 42 or poor connection in line 41) a voltage will be induced in core 43 which will be transmitted to amplifier 26 causing lamp 27 to light.

Figure 6:
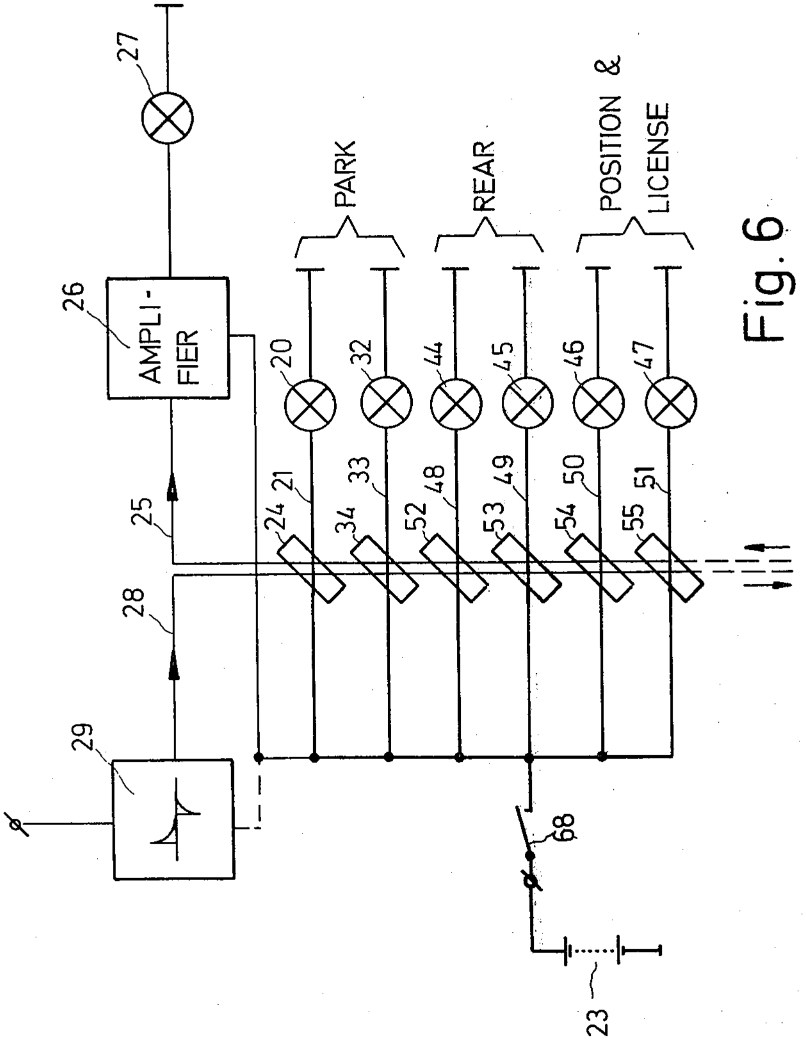
FIG. 6 is a schematic diagram of a further embodiment.

Embodiment of FIG. 6: A plurality of lights are monitored, for example the park, rear and position and license lights. Upon operation of a central switch 58, all lamps must light. Each one of the lamps 20, 32, 44, 45, 46 and 47 has an electric supply line 21, 33, 48, 49, 50, 51. Each one of the lines 21, 33, 48, 49, 50, and 51 has a respective ferrite core 24, 34, 52, 53, 54, 55 thereon. The supply lines 21, 33, 48, 49, 50, 51 are connected to a central switch 68 which connects to the battery of the vehicle. Upon connection of switch 68, source 23 of the vehicle is connected to the pulse source 29 and to the amplifier 26. If any one of the lamps 20, 32, 44, 45, 46, 47 malfunction, read wire 25 which, together with the signal wire 28 is threaded through the ferrite cores 24, 34, 52, 53, 54, 55 will have a signal induced therein which is applied over amplifier 26 to cause lamp 27 to light, thus giving a warning signal.

Figure 7:
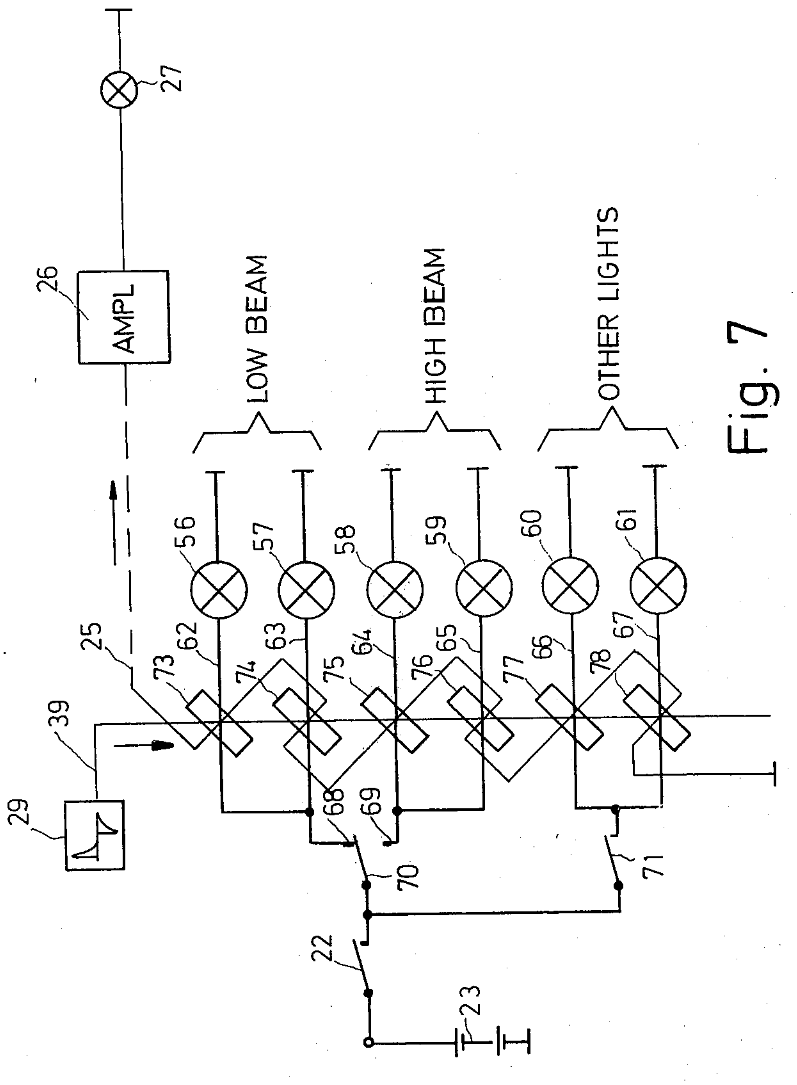
FIG. 7 is a schematic diagram of yet another embodiment.

Embodiment of FIG. 7: Lamps 56, 57 represent the low beam lamps of the head lights of a vehicle; lamps 58, 59 the high beam; lamps 60, 61 represent auxiliary lights, for example fog lights, brake lights, or the like. The lamps 56–61 have associated supply lines 62–67. Lines 62, 63 are connected to one transfer contact 68 of a switch 70; lines 64, 65 are connected to transfer contact 69 of switch 70. Switch 70, in turn, is connected to main switch 22 for the light system, which is connected to source 23. Lines 66, 67 are connected to a separate switch 71 which is also connected to be operated by switch 22. If lamps 60, 61 are to be the brake lights, switch 71 would be the brake light warning switch and it would be connected, directly, to the source 23.

Cores 73–78 are slipped over the respective lines 62–67. The signal wire 39 is additionally passed through cores 73–78, and supplied from pulse source 29. The read wire 25 is passed in such a manner through the cores that it is passed therethrough oppositely in respective cores associated with one lamp system, for example the cores 73, 74 of the low beam head lights.

Operation: If all lamps are operative, for example lamps 56, 57 are energized and 60 and 61 are energized, read wire 25 will have no voltage induced therein, so that the lamp 27 will remain extinguished. If one of the lamps becomes inoperative, voltage will be induced in read wire 25 and cause an indication on lamp 27. If switch 22 is opened (or switch 71 is opened and connected directly to source 23) no voltage will be induced in the read wire 25 since, due to the reverse direction of the read wire 25 through paired cores, with respect to the signal wire 39, voltages induced in the read wire will cancel and no voltage will be applied to amplifier 26. Thus, switch 71 may be connected to either side of switch 22, and, even if switch 71 is opened (and switch 22 closed), no indication will be obtained at line 27. Any further number of lights or other loads may be connected, provided that they are paired, that is, have two lines and two cores; if a single light supply is to be connected, then a compensating core and a compensating line (FIG. 5) should be added.

Figure 8:
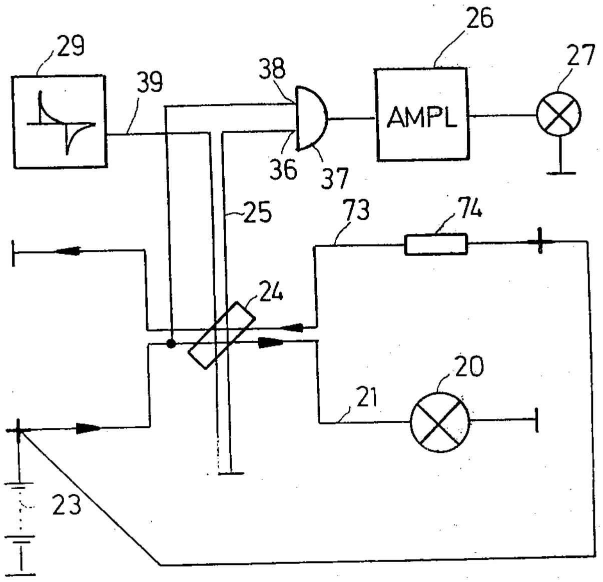
FIG. 8 is a schematic diagram of yet another embodiment.

Embodiment of FIG. 8: Lamp 27 is designed to light if an upper limit is exceeded as well as if a lower limit is passed.

Supply line 21 of lamp 20 is carried through core 24, and connected to the positive terminal of source of supply 23. Signal wire 39 is connected with pulse source 29, and read line 25 is further connected through core 24. The read line 25 is connected to a first terminal 36 of an AND-gate 37, the second terminal 38 of the AND-gate 37 being connected to line 21 which connects to lamp 20. A compensating line 73 is additionally threaded through the core 24, the compensating line being connected on the one hand with the positive terminal 23 of the battery and on the other with chassis or ground, that is, the negative terminal of battery 23. The connection is so selected that the direction of current flow through line 23 is opposite to that of line 21. A resistor 74 is connected in series in line 73. The compensating resistor limits the current flowing through line 73 which corresponds to the current in line 21.

Operation: In normal operation, lamp 20 will draw a current through line 21 which would tend to saturate the core; this current is, however, counterbalanced by an equal and opposite current flowing through line 73. A signal is induced in read wire 25 applied to the first input of AND-gate 37, which is energized since the second input 38 is connected to positive terminal of source 23, so that lamp 27 will light. This is a special situation, indicating, when the lamp 27 is ON, that the supervised load, here lamp 20, is in order. If lamp 20 burns out, only the compensation current will flow through the compensation line 73, saturating core 24 so that lamp 27 will extinguish.

Figure 9:
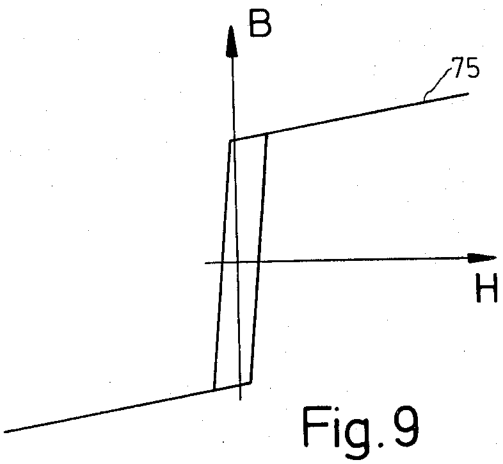
FIG. 9 is a graph illustrating the operation of the device of FIG. 8.

FIG. 9 illustrates a diagram of magnetic induction with respect to field strength. When both lamp current and compensating currents flow, then the magnetization of the core changes in accordance with the hysteresis loop, so that signals in wire 39 are transferred to read line 25. If lamp 20 burns out, or there is malfunction in the compensating line 73 or resistor 74, the working point will be changed on the upper branch of the hysteresis loop to a point 75 and only very low signals will be induced in the read wire 25.

Figure 10:
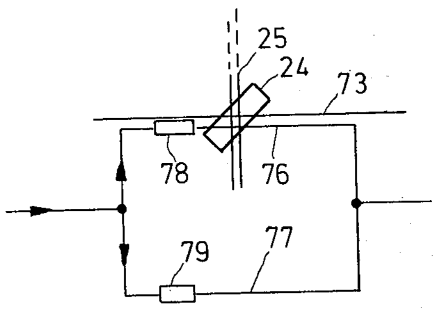
FIG. 10 is a fragmentary diagram of a network for use in the embodiment of FIG. 8.

Typical ferrite cores 24 are saturated already by a comparatively small current, that is, of about 100 to 200 milliamperes. Lamp current flowing through lamp 20 may be a high multiple of this saturation current. In order to draw a small compensating current in line 73, it may be desirable to split the lamp current in two partial currents. As seen in FIG. 10, only one of the lines carrying a partial current, line 76, is carried through core 24. The compensation current flowing in line 73 then need be only large enough to compensate for the partial current flowing in line 76. The division of total current drawn by lamp 20 in the two parallel lines 76, 77 is obtained by respective resistors 78, 79 in series with the lines 76, 77.

Pulse source 29, and the utilization system formed of amplifier 26 and indicator 27, and connected to the read wire 25 should become operative as soon as the vehicle is started, that is, upon operation of the ignition switch. At the latest, however, the pulse source should be started when the associated load is connected.

Pulse source 29 may be a specially provided oscillator or a-c source, for example a multivibrator circuit. It may, however, also be a pulse source or other a-c source already present in the vehicle and providing pulses additionally for other uses, which may additionally be supplied to the signal wire 39. For example, pulses can be applied to signal wire 39 derived from the ignition system of the motor vehicle; they may, also, be obtained from a monostable multivibrator which, for example, is present in many typical control systems to electronically control the injection time of electronically controlled fuel injection systems.

Various changes and modifications may be made within the scope of the inventive concepts and features described with any one embodiment may appropriately be used with other embodiments.

We claim:

1. In an automotive vehicle having headlight lamps (20, 32), a battery (23), electrical supply lines (21, 33) connecting the battery (23) to the headlights (20, 32) and a switch (22) interposed between the battery and said supply lines to selectively connect, or disconnect current flow from the battery through the supply lines to the headlights;

an electrical supervisory system to monitor current flowing through said supply lines (21, 33) to the headlights (20, 32) comprising at least one ferrite core having at least one opening therethrough and having an approximately square hysteresis characteristic, the supply line (21, 33) to at least one of the headlights (20, 32) passing through an opening of the core, the core being saturable upon current flow through the supply line when the switch (22) is closed;

a test signal wire (28, 39) passing through an opening of the core;

a read signal wire (25) passing through an opening of the core;

an a-c source (29) connected to the test signal wire;

a headlight defect indicator means (27);

and an AND-gate (37), the read signal wire (35) being connected to one input (36) of the AND-gate, and the battery (23) being connected through the switch (22) to the other input (38) of the AND-gate (37), the output of the AND-gate (37) being connected to the indicator means (27), to energize the AND-gate upon conjunction of:

(a) closing of the switch (22) and hence energization of the supply lines (21, 33) to the headlights (20, 32) and (b) failure of current flow to at least one of said headlights by energization of the read signal wire (35) by transformer action from the test signal wire upon non-saturated condition of the core due to lack of current flow through the respective supply line (21, 33) to the respective headlight (20, 32), and to isolate the indicator means from the read signal wire (35) when the switch (22) is open.

2. System according to claim 1 wherein the indicator means (27) comprises an amplifier (26) and a control lamp (27) connected to the amplifier, the control lamp lighting when the core is unsaturated.

3. System according to claim 1 wherein the a-c source comprises an astable multivibrator (29).

4. System according to claim 1 wherein the a-c source comprises the ignition system of the vehicle.

5. System according to claim 1 wherein the a-c source comprises an electronic fuel injection system.

6. System according to claim 1 comprising (FIG. 5) a compensating core (43) having the test signal wire connected to the a-c source passing therethrough;

an electric supply to said compensating core (43) and means (42) providing for current flow through the compensating core to drive the core to saturation when said means are energized;

the read signal wire being wound about said compensating core, the number of turns being proportional to the number of cores through which supply lines pass, and the winding direction being reversed with respect to the direction of the test signal wires of said other cores through which the supply lines pass.

7. System according to claim 1 wherein (FIG. 7) two or more separate lamps are provided, each having a supply line, and a core thereon;

wherein the read signal wire is passed through the respective cores in opposite directions in alternate cores which are connected to be commonly energized, with respect to the direction of the test signal wires passing through said cores.

8. System according to claim 1 further comprising (FIG. 8) a compensating line (73) passing through the core (24) and means passing current through said compensating line equal and opposite to the current to the lamps.

9. System according to claim 1 further comprising means (77, 78, 79) dividing the current to the load and forming a shunt to the supply line to the load, the shunt (76) passing through the core carrying only a portion of the load current;

said dividing means comprising resistance means (78, 79).

* * * * *